United States Patent
Ikram

(10) Patent No.: US 11,151,286 B2
(45) Date of Patent: Oct. 19, 2021

(54) COMPUTER DEVICE AND METHOD FOR MANAGING PRIVILEGE DELEGATION

(71) Applicant: Avecto Limited, Manchester (GB)

(72) Inventor: Omar Ikram, Stockport (GB)

(73) Assignee: Avecto Limited, Manchester (GB)

( * ) Notice: Subject to any disclaimer, the term of this patent is extended or adjusted under 35 U.S.C. 154(b) by 219 days.

(21) Appl. No.: 15/995,311

(22) Filed: Jun. 1, 2018

(65) Prior Publication Data

US 2018/0349625 A1    Dec. 6, 2018

(30) Foreign Application Priority Data

Jun. 2, 2017    (GB) ...................................... 1708824

(51) Int. Cl.
*G06F 21/62* (2013.01)
*H04L 29/06* (2006.01)
(Continued)

(52) U.S. Cl.
CPC ........ *G06F 21/629* (2013.01); *G06F 9/44526* (2013.01); *G06F 21/6218* (2013.01);
(Continued)

(58) Field of Classification Search
CPC .............. G06F 21/629; G06F 9/44526; G06F 21/6218; H04L 9/3271; H04L 63/08;
(Continued)

(56) References Cited

U.S. PATENT DOCUMENTS 5,881,225 A    3/1999    Worth
5,991,542 A    11/1999   Han et al.
(Continued)

FOREIGN PATENT DOCUMENTS

EP    2750035 A1    7/2014
GB    2486528 B     9/2016
(Continued)

OTHER PUBLICATIONS

Dalton,"Nemisis: Preventing Authentication & Access Control Vulnerabilities in Web Application", 2009, Computer Systems Laboratory, pp. 1-16 (Year: 2009).*
(Continued)

*Primary Examiner* — Taghi T Arani
*Assistant Examiner* — Gregory A Lane
(74) *Attorney, Agent, or Firm* — Morris, Manning & Martin, LLP; Daniel E. Sineway; Adam J. Thompson

(57) ABSTRACT

Privilege delegation in a computer device is managed by invoking a utility by a first user account. A requested command is captured by an agent plugin which is provided as a plugin to the utility. The agent plugin sends a request message to an agent, which determines an outcome for the requested command including allowing or blocking. If allowed, a reply message from the agent instructs the agent plugin to provide command information to the utility to run the requested command by the operating system with delegated privileges of the second user account. The agent plugin can also be instructed to perform custom messaging, or passively handle the requested command via a child plugin.

20 Claims, 5 Drawing Sheets

(51) Int. Cl.
*G06F 9/445* (2018.01)
*H04L 9/32* (2006.01)

(52) U.S. Cl.
CPC ............ *H04L 9/3271* (2013.01); *H04L 63/08* (2013.01); *H04L 63/083* (2013.01); *H04L 63/10* (2013.01); *H04L 63/104* (2013.01); *H04L 63/20* (2013.01); *G06F 2221/2141* (2013.01)

(58) Field of Classification Search
CPC ..... H04L 63/083; H04L 63/10; H04L 63/104; H04L 63/20
USPC .......................................................... 726/21
See application file for complete search history.

(56) References Cited

U.S. PATENT DOCUMENTS

| | | | |
|---|---|---|---|
| 6,233,618 | B1 | 5/2001 | Shannon |
| 7,133,904 | B1 | 11/2006 | Soyha et al. |
| 7,219,354 | B1 | 5/2007 | Huang et al. |
| 8,368,640 | B2 | 2/2013 | Dardinski et al. |
| 8,726,299 | B1 * | 5/2014 | Bromley ................. G06F 9/541 719/328 |
| 9,158,662 | B1 | 10/2015 | Hanes et al. |
| 9,769,131 | B1 | 9/2017 | Hartley |
| 10,803,499 | B1 | 10/2020 | Davis et al. |
| 2002/0144137 | A1 | 10/2002 | Harrah et al. |
| 2002/0174256 | A1 * | 11/2002 | Bonilla ................... G06F 9/468 719/310 |
| 2004/0210771 | A1 | 10/2004 | Wood et al. |
| 2005/0188370 | A1 | 8/2005 | Kouznetsov et al. |
| 2006/0089834 | A1 | 4/2006 | Mowatt et al. |
| 2007/0180502 | A1 | 8/2007 | Yadav et al. |
| 2007/0198933 | A1 | 8/2007 | Van Der Bogert et al. |
| 2008/0060051 | A1 | 3/2008 | Lim |
| 2008/0289026 | A1 | 11/2008 | Abzarian et al. |
| 2009/0070442 | A1 * | 3/2009 | Kacin ................. H04L 41/0803 709/221 |
| 2010/0274366 | A1 | 10/2010 | Fata et al. |
| 2011/0030045 | A1 | 2/2011 | Beauregard et al. |
| 2011/0173251 | A1 | 7/2011 | Sandhu et al. |
| 2011/0196842 | A1 | 8/2011 | Timashev et al. |
| 2011/0239288 | A1 | 9/2011 | Cross et al. |
| 2011/0251992 | A1 | 10/2011 | Bethlehem et al. |
| 2012/0047259 | A1 | 2/2012 | Krasser et al. |
| 2012/0054744 | A1 | 3/2012 | Singh et al. |
| 2012/0066512 | A1 | 3/2012 | Kass et al. |
| 2012/0226742 | A1 | 9/2012 | Mornchilov et al. |
| 2013/0057561 | A1 | 3/2013 | Nave et al. |
| 2013/0339313 | A1 | 12/2013 | Blaine et al. |
| 2014/0279600 | A1 | 9/2014 | Chait |
| 2014/0281528 | A1 * | 9/2014 | Dubey .................... H04L 67/10 713/168 |
| 2015/0040181 | A1 | 2/2015 | Cook et al. |
| 2015/0058839 | A1 | 2/2015 | Madanapalli et al. |
| 2015/0074828 | A1 | 3/2015 | Beauregard et al. |
| 2015/0128250 | A1 | 5/2015 | Lee et al. |
| 2016/0203313 | A1 | 7/2016 | El-Moussa et al. |
| 2016/0217159 | A1 | 7/2016 | Dahan et al. |
| 2016/0378962 | A1 | 12/2016 | Austin |
| 2017/0011220 | A1 | 1/2017 | Efremov et al. |
| 2017/0048259 | A1 | 2/2017 | Dodge et al. |
| 2017/0054760 | A1 | 2/2017 | Barton et al. |
| 2017/0111368 | A1 | 4/2017 | Hibbert et al. |
| 2018/0024895 | A1 | 1/2018 | Kumarasamy et al. |
| 2018/0302409 | A1 * | 10/2018 | Hope .................. G06F 21/6281 |
| 2019/0121631 | A1 | 4/2019 | Hua et al. |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Search Report dated Dec. 1, 2017 for United Kingdom Pat. Appl. No. GB1708824.6.
Chris Hoffman and Justin Pot; "How to Install Applications on a Mac: Everything You Need to Know"; HowToGeek.com website [full url in ref.]; Jul. 20, 2017 (Year 2017).
Chris Hoffman; "How to Disable System Integrity Protection on a Mac (and Why You Shouldn't)"; HowToGeek.com website [full url in ref.]; Jul. 5, 2017 (Year 2017).
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB1808380.8.
Combined Examination & Search Report dated Mar. 6, 2019 for United Kingdom Patent Application No. GB1814798.3.

* cited by examiner

COMPUTER DEVICE AND METHOD FOR MANAGING PRIVILEGE DELEGATION

RELATED APPLICATIONS

The present application claims priority to application number GB1708824.6 filed 2 Jun. 2017 in United Kingdom, the entire content of which is incorporated herein by reference.

TECHNICAL FIELD

The present description relates generally to the field of computers and computer devices. More particularly, the present description relates to a mechanism for managing privilege delegation in a computer device.

BACKGROUND

It is desirable to implement a least-privilege access security model, whereby each user is granted only a minimal set of access privileges. However, many applications require a relatively high privilege level, such as a local administrator level, in order to install and operate correctly.

Some forms of operating system provide access to the security privileges of another user on a temporary basis. In particular, Unix-like operating systems support commands such as 'su', by which the user can conveniently switch user privileges by entering a password of a higher-privileged target account. Such a system is sufficient for individual users having appropriate knowledge and credentials, but does not readily scale across organisations.

Some operating systems, again in particular those with Unix-like behaviour, support a utility for delegated privilege management. One well-known example is the 'sudo' utility. Conveniently, a system administrator can now give permission to specific users to run specific commands with higher privilege levels, but without revealing the credentials of the target account. Such a delegation utility typically permits access even to the root of the host device, i.e. the most powerful privilege level.

A difficulty arises in that the utility for delegated privilege management must be accurately configured in order to operate correctly. Typically, configuration is needed separately on each computer device, which is a significant overhead in a large organisation. The configuration requires a high degree of skill and accuracy. Inevitably, there are opportunities for human error in the configuration, and difficulties in maintaining the configuration.

Another difficulty arises in that the user interface of the utility is often inappropriate for a large group of users with widely diverse skills. Hence, users have difficulty in correctly operating the utility, or require a high degree of training and support. Further, the utility typically has restricted functionality when interacting with users.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer device, a method and a computer-readable storage medium as set forth in the appended claims. Additional features of the invention will be apparent from the dependent claims, and the description herein.

There now follows a summary of various aspects and advantages of the described examples. This summary is provided as an introduction to assist those skilled in the art to more rapidly assimilate the detailed discussion herein and is not intended in any way to limit the scope of the claims that are appended hereto.

In general there is described an improved computer device and method for managing privilege delegation in a computer device, wherein an agent component determines whether privilege delegation is to be allowed or blocked in relation to a requested command based on communications with a plugin to a utility, and the utility performs the requested command with a delegated privilege only when permitted by the agent.

In one example, privilege delegation in a computer device is managed by invoking a utility by a first user account. A requested command is captured by an agent plugin which is provided as a plugin to the utility. The agent plugin sends a request message to an agent, which determines an outcome for the requested command including allowing or blocking. If allowed, a reply message from the agent instructs the agent plugin to provide command information to the utility to run the requested command by the operating system with delegated privileges of a second user account. The agent plugin can also be instructed to perform custom messaging, or passively handle the requested command via a child plugin. The agent may monitor the utility to confirm that the agent plugin remains registered.

In one example, there is described a method of managing privilege delegation in a computer device, comprising: invoking a utility by a first user account, wherein the utility temporarily delegates privileges of a second user account to a requested command in an operating system of the computer device; capturing the requested command by an agent plugin which is provided as a plugin to the utility; communicating with a request message from the agent plugin to an agent which determines an outcome for the requested command including at least allowing or blocking the requested command; and communicating with a reply message from the agent to the agent plugin, wherein the agent plugin, if the reply message indicates that the requested command is allowed, provides command information to the utility to run the requested command by the operating system with delegated privileges of the second user account.

In one example, custom messaging is presented by the agent plugin in response to an instruction in the reply message from the agent.

In one example, the custom messaging comprises a message dialog in a terminal from which the utility was invoked.

In one example, the custom messaging presents a custom block message provided by the agent in the reply message upon determining blocking of the requested command.

In one example, input from the message dialog is relayed from the agent plugin to the agent, wherein the agent determines allowing or blocking of the requested command based also on the input of the dialog as relayed by the agent plugin.

In one example, the custom messaging comprises at least one of a confirmation, a challenge-response, and a reason.

In one example, auditing is performed by the agent in relation to the custom messaging.

In one example, a child plugin is loaded by the agent plugin, and the agent plugin passively handles the requested command to the child plugin in response to an instruction in the reply message from the agent.

In one example, the child plugin is loaded by the agent plugin from a default plugin location of the utility.

In one example, the requested command is passed from the agent plugin to the child plugin and a response from the child plugin is passed via the agent plugin to the utility.

In one example, the agent is informed by the agent plugin of the response from the child plugin.

In one example, the child plugin refers to a policy configuration file of the utility.

In one example, the agent monitors a configuration file of the utility where a plugin is registered and, when the agent plugin is not registered, registers the agent plugin in the configuration file.

In one example, the second user account is a root account of the computer device.

In one example, the operating system is Unix-like.

In one example, capturing the requested command further comprises capturing an argument of the requested command as input to the utility.

In one example, the request message further comprises a set of identities captured by the agent plugin, and the agent determines an outcome for the requested command based on the set of identities in the request message.

In one example, the set of identities include at least a user identity (UID) of the first user account, a group identity (GID), a process identity (PID) of the utility, and a process identity of a parent process (PPID).

In one example, the agent is coupled to a policy file containing rules which define conditions for the first user account to access the requested command.

In one example, the policy file is updated by the agent with updates from a network location accessible by the computer device.

In one example, there is described a computer device having a processor and a machine-readable medium containing instructions which when executed by the processor perform any of the methods discussed herein.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

To show how example embodiments may be carried into effect, reference will now be made to the accompanying drawings in which.

DETAILED DESCRIPTION

At least some of the following examples provide an improved mechanism for managing privilege delegation in a computer device or computer network. The example mechanism is simple and convenient for a user, and is lightweight to implement. Further, the example embodiments uphold security of computer devices while provided an enhanced gateway for privilege delegation. Many other advantages and improvements will be discussed in more detail herein.

Figure 1:
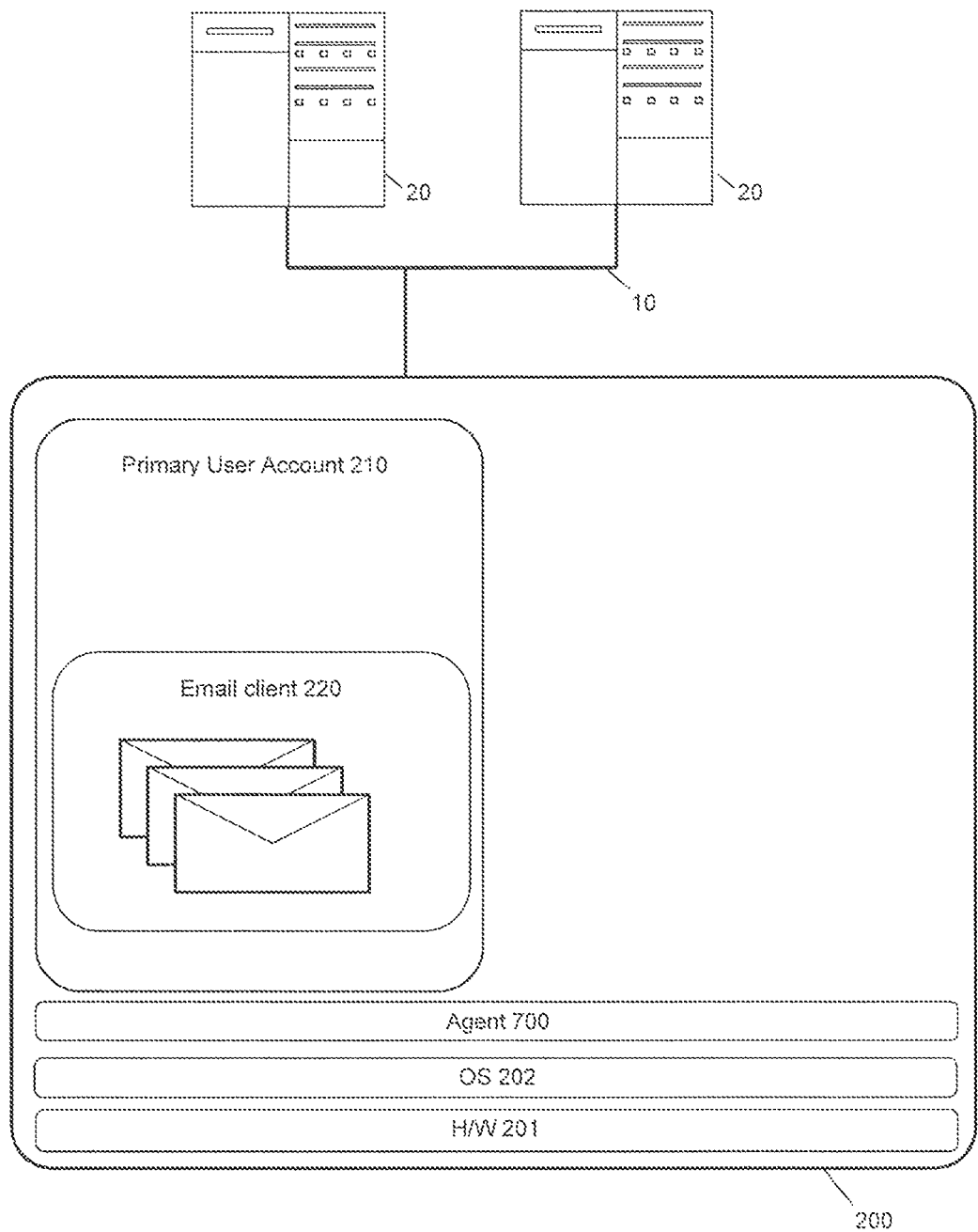
FIG. 1 is a schematic view of an example computer device.

FIG. 1 is a schematic overview of part of a computer network. In this simplified example, a user computer device 200 is coupled by a network 10 to a set of servers 20. For example, the network 10 can be a private network, a virtual private network, an intranet, a cloud, or the Internet. In practice, computing environments for large-scale corporations include many thousands of individual user computer devices coupled to thousands of individual servers in several logical domains.

The computer device 200 may take any suitable form factor, which might be a server, a desktop computer, a portable computing device, laptop, tablet, smartphone, etc. The illustrated computer device 200 comprises a layer of physical hardware H/W 201, which suitably includes memory, processors (CPUs), I/O input/output interfaces (e.g. NIC network interface cards, USB universal serial bus interfaces, etc.), storage (e.g. solid state non-volatile storage or hard disk drive) and so on. The hardware layer 201 supports an operating system 202 to provide a runtime environment for execution of user processes or productivity applications 220. This runtime environment typically provides resources such as installed software, system services, drivers, and files. In this illustration, the user processes include an email client application 220, though many other types of software application can be installed according to the needs of the users of this particular device.

In this example, the operating system 202 applies a security model wherein access privileges are based on a user account 210. The operating system 202 may define privilege levels appropriate to different classes of users, or groups of users, and then apply the privileges of the relevant class or group to the particular logged-in user (e.g. ordinary user, super-user, local administrator, system administrator and so on). The current user is authenticated such as by logging-in to the computer device 200, e.g. with a user identity and password, and these user credentials may be validated locally or via a remote service such as a domain controller. The user, via their previously prepared security account, thus acts as a security principal in the security model. The operating system 202 of the computer device 200 then grants appropriate privileges to the processes or applications 220 which execute in the security context of that primary user account 210.

In this example, the computer device 200 further comprises an agent 700. The agent 700 may comprise one or more software and/or hardware modules, such as executables, dynamic link libraries (DLLs), plug-ins, add-ins, add-ons or extensions. The agent 700 is configured to operate in cooperation with the operating system 202 and the client applications 220. In particular, the agent 700 may provide and coordinate core capabilities for security, which suitably include at least privilege management and application control.

For application control, the agent 700 is arranged to ensure that only authorised applications 220 operate on the computer device 200. For example, the agent 700 is governed by rules based on trusted application types, thereby automatically stopping unapproved applications from running. There may be a sophisticated set of rules which define the conditions under which each application may operate, in relation to the intended host computer device 200 and the relevant user account 210. Thus, the example email client application 220 will only be allowed to operate on the computer device 200 if permitted by the rules as used by the agent 700.

When considering privilege management, it is desirable to implement a least-privilege access security model, whereby each user is granted only a minimal set of access privileges for their primary user account 210. However, many applications require a relatively high privilege level, such as a local administrator level, in order to install and operate correctly. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, leading to errors or corruption within the computer device. Further, an infection or malware may maliciously access resources of the computer device with the deliberate intention of subverting security or causing damage.

Some forms of operating system provide access to the security privileges of another user on a temporary basis. In particular, Unix-like operating systems support commands such as 'su', which then enables commands to be executed with privileges appropriate to another user account. Typically, running the command 'su' from the command line prompts the current user to enter the password of the intended target user account. If authenticated, the current user then gains temporary access to the privileges of the target user account, but without changing the current working directory or user environment. Thus, the user can conveniently switch user privileges, but only with knowledge of the relevant password of the target account. Such a system is sufficient for individual power users having appropriate knowledge and credentials, but does not readily scale across organisations.

Figure 2:
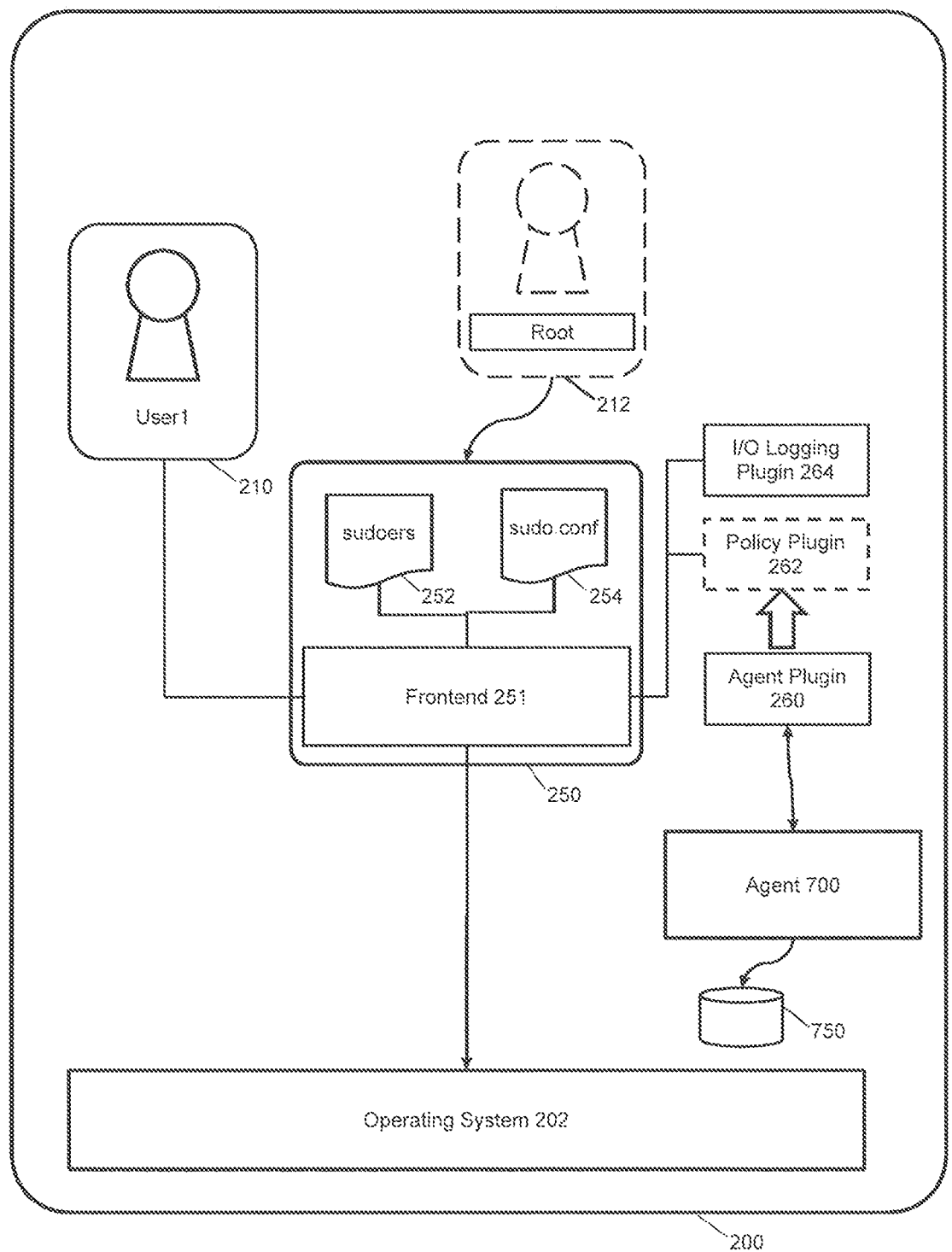
FIG. 2 is a schematic view of the computer device in operation.

FIG. 2 illustrates an example mechanism for delegated privilege management. Some operating systems, again in particular those with Unix-like behaviour, support programs or utilities for delegated privilege management. One well-known example is the 'sudo' utility, which will be discussed for illustration below. Unix-like operating systems include those meeting the Single UNIX Specification (SUS) such as macOS (OS X), along with similar systems such as implementations of Linux, BSD and others, as will be familiar to those skilled in the art. Conveniently, a system administrator can now delegate permission to specific users to run specific commands with higher privilege levels, but without revealing the credentials of the target user account. Such a delegation utility typically permits access even to the root level of the host system, i.e. the most powerful privilege level. Usually, a configuration file 252 on each host computer device 200 specifies which users are permitted to run which commands and at which privilege level. Thus, the configuration file 252 has to be carefully prepared and is a source of vulnerability in the system, especially due to human error. These delegation utilities also typically provide extensive logging of each command and user request. Further background information is provided at www.sudo.ws, the entire content of which is incorporated by reference herein.

As illustrated, the current user has a primary user account 210 on the host computer device 200. Also, the host 200 has a target user account 212, such as the super user or root account (i.e. user id 0) having higher privilege levels. The utility 250 selectively delegates privileges of the target user account 212 when performing certain specific commands of the operating system 202.

In operation, the utility 250 is invoked, e.g. by entering the command sudo in the command line of the operating system 202. Also, the user supplies a requested command which they desire to access. The utility can be configured to permit passing arguments, or multiple commands. Typically, the utility 250 consults a policy configuration file 252, which is securely located for example at /usr/local/etc/sudoers. Conveniently, the policy configuration file 252 is a text file with appropriate syntax, which may be prepared in a suitable text editor such as visudo. This policy configuration file 252 sets access conditions, such as requiring the user to supply again their own password appropriate to the primary user account 210 in order to confirm authentication. The utility 250 then invokes the requested command with the operating system 202 under the enhanced privileges of the relevant target user account 212. The configuration file 252 provides detailed control of the utility 250, including enabling commands only from a particular host device 200, requiring a password per user or group, requiring re-entry of a password every time, caching a password for a time period, or not requiring a password at all for a particular command. These and many other features of the utility 250 will be familiar to those skilled in the art.

Where the requested command invokes a program, then that program or application can be invoked using the target user account 212. As a practical example, a web application here for illustration called 'webservice' requires privileges of the target user account 212 in order to operate, whereas the current user account 210 does not have privileges for this application. The configuration file 252 defines a configuration which permits user1 to operate the utility 250 for this requested command, such as 'user1 ALL=(ALL)/usr/sbin/service webservice *'. Hence the current user, here called user1, may now start the web service application using the utility 250 such as by entering this example requested command '% sudo/usr/sbin/service webservice start'. The requested command in this example includes the argument start to start the web application. Equivalently, the login user can now stop or restart the web application, as needed.

In this example, the utility 250 has a modular framework which supports a plugin application programming interface (API). More specifically, the plugin API supports one policy plugin 262 and one I/O logging plugin 264. The utility 250 is typically supplied with default pair of plugins. Each such plugin may be compiled as a dynamic shared object, or complied statically into the executable binary of the utility 250. However, this plugin API allows the utility 250 to be configured to use a policy plugin and/or an I/O logging plugin which instead have been provided by third parties. The plugin to be used is specified in another configuration file 254, suitably securely located at /etc/sudo.conf. Typically, these configuration files 252, 254 are not accessible by the primary user account 210. As illustrated, the utility 250 allows only a single policy plugin 262 to avoid ambiguities. Hence, a third party plugin which is registered with the utility 250 will replace the default plugin.

According to this modular framework, a frontend 251 of the utility 250 queries the policy plugin 262 to determine whether or not a command to be allowed. If allowed, then the policy plugin 262 provides a description of how to run the command along with any argument vector and an appropriate target user account. The frontend 251 of the utility 250 passes this command information to the operating system 202, ready to be used for example in an execve( )

system call. The requested command is then run by the operating system 202. The utility 250 will then pass to the I/O logging plugin 264 any and all input to, and output from, the requested command.

There is a disadvantage in that the third party developer must now ensure that their policy plugin 262 adequately handles all possible scenarios, to ensure that system integrity is maintained. Also, there is no default fallback mechanism to the default plugin which uses the policy configuration file 252 within the utility 250. Both of these disadvantages are now addressed by the example mechanism.

As illustrated, the agent 700 is associated with a third-party agent plugin 260. This agent plugin 260 is registered as the policy plugin 262 of the utility 250. The agent plugin 262 is communicatively linked to the agent 700. Conveniently, the agent 700 and the agent plugin 260 are linked by an inter-process communication (IPC) local socket. The agent 700 is coupled to a policy file 750 which contains a set of rules defining how the user of the primary user account 210 is able to run programs on the system 200. Conveniently, this policy file can be shared also with other functions of the agent 700, such as the application control function as mentioned above. In this way, the agent 700 is able to leverage rules which have already been developed in relation to, for example, application control, such as defining user groups or user roles and related application permissions, and now extend those same rules also to privilege delegation.

Suitably, the policy file 750 is a structured file such as an extensible mark-up language XML file, thus being more powerful and more flexible than a plain text file. The policy file 750 is suitably held locally on the host device 200. The agent 700 may be pushed updates or may poll for updates to the policy file 750, which can be held elsewhere on the network such as on one of the servers 20. The policy file 750 is readily updated and maintained, such as from a central management console, ensuring consistency for all devices across the network. Hence, the policy file 750 of the agent 700 is much more robust and manageable for a large-scale organisation with many hundreds or thousands of individual computer devices 200.

Figure 3:
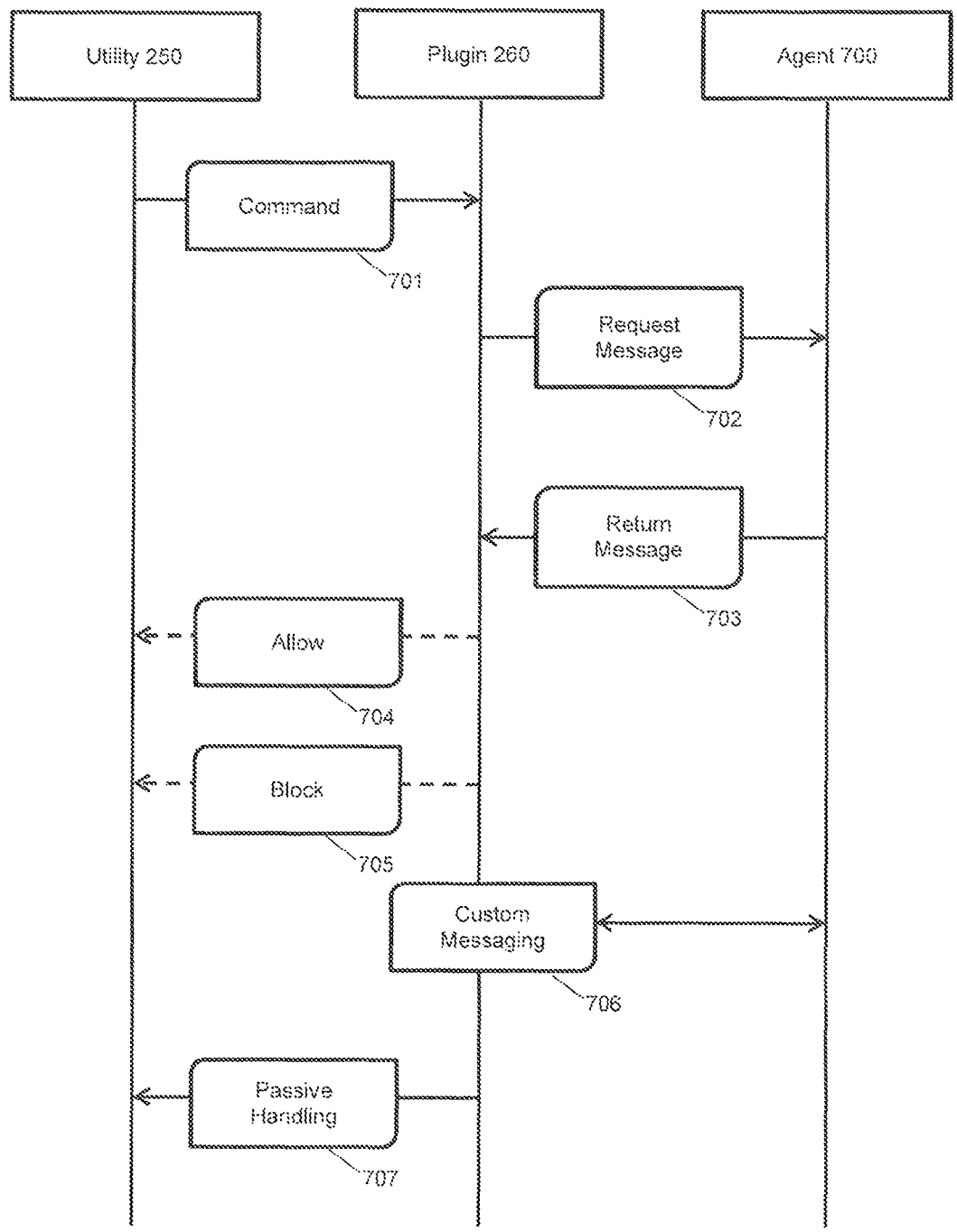
FIG. 3 is a schematic view of the example computer device in more detail.

FIG. 3 shows operation of the computing device 200 in more detail. Here, the user invokes the utility 250 and provides the requested command 701 and any appropriate arguments. The utility 250 identifies from the plugin configuration file 254 that a policy plugin 262 has been registered, namely the agent plugin 260 associated with the agent 700. The utility 250 loads this plugin 260 and communicates through the API. In this example, the plugin 260 captures the requested command along with any arguments. Also, the plugin 260 suitably captures a set of identities, which will be used to determine an appropriate outcome based on rules in the policy file 750. For example, the plugin 260 may capture one or more of: a process identity PID of the utility 250, an identity of a parent process PPID, a group identity GID and a user identity UID of the current user account 210. Conveniently, these fields are packaged into a request message 702 and sent to the agent 700 for evaluation. The agent 700 consults the policy file 750 to determine how to handle the request message 702. The agent 700 sends a response message 703 to the plugin 260, wherein the plugin 260 is instructed to perform one of a set of actions. Hence, the determining activity now takes place at the agent 700 rather than within the plugin 260.

In one example, the plugin 260 is instructed to allow the requested command. In which case, the plugin 260 informs the utility 250 to proceed at 704. The frontend 251 of the utility 250 then implements the requested command on the operating system 202, as explained above. The allow instruction may, or may not, require re-input of the user password, consistent with regular behaviour of the utility 250. Conversely, the plugin 260 can be instructed to block the request, in which case the utility 250 is informed that the command has been denied at 705. However, the example plugin 260 is further able to perform custom messaging at 706 and passive handling at 707, which will now be discussed in more detail.

Custom Messaging

As noted above, the utility 250 typically includes a simple password based authentication which can be specified for certain commands in the policy configuration file 252. However, the agent 700 in the example embodiment now instructs the plugin 260 to perform custom messaging at 706. In particular, the plugin 260 may present a message dialog in a terminal from which the utility was invoked. The custom messaging may be presented on a display of the computer device for interaction with the user. Input from the user may be returned via the plugin 260 to the agent 700 for evaluation. Hence, the agent 700 is able to interact with the user with a rich set of customizable messages.

In one example, the custom messaging 706 may include at least one of a confirmation, a challenge-response, or a reason. In more detail, the confirmation may present a dialog which receives a binary yes/no type response, allowing the user to confirm that they do indeed wish to proceed and providing an opportunity to double-check the intended action. The custom messaging conveniently allows specific text to be included in the dialog, for example reminding the user that their request will be logged and audited. As another option, the custom messaging 706 may provide specific block messages, explaining to the user why their request has been blocked, thus enabling improved interaction with the user. The challenge-response allows alternate forms of authentication to be employed, such as a two-factor authentication. In one example, the challenge-response requires entry of a validation code, which might be provided such as from a second device or IT helpdesk. The reason allows the user to provide feedback concerning the motivation for their request. Logging the reasons from a large set of users allows the system to be administered more efficiently in future, such as by setting additional rules in the policy file 750 to meet the changing needs of the user population.

In one example, the custom messaging 706 may require additional authentication to be presented by the user, which might be based on both their username and password credentials, or some other form of authentication. Each of these individual custom messages may be defined in the policy file 750. Notably, these custom messages go far beyond the capabilities of the utility 250, and the agent 700 provides an enhanced gateway to the utility 250.

The policy file 750 may define that auditing is performed at the agent 700 in relation to each request. The auditing may include the customised messaging, and may include an outcome of the request. The custom messaging may eventually result in a decision to allow or block the command, which is then reported to the utility 250 from the plugin 260. An appropriate allow or block decision is then passed from the plugin 260 into the utility 250, which is carried out as discussed above.

Passive Handling

Figure 4:
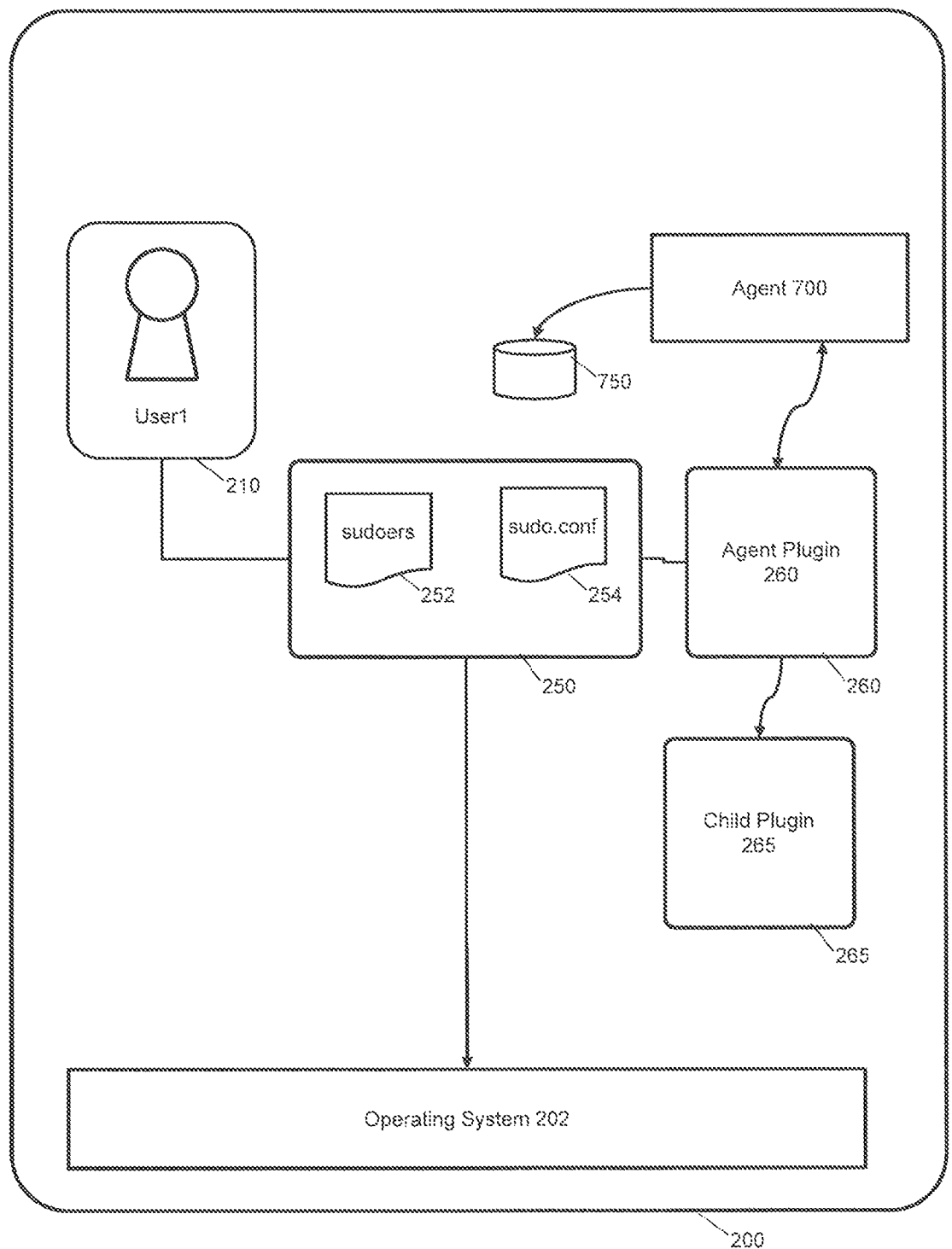
FIG. 4 is a schematic view of the example computer device in more detail.

FIG. 4 further illustrates an example wherein the agent plugin 260 is instructed to passively handle the requested command. Here, the agent plugin 260 is able to pass the requested command as captured by the utility 250 to be handled instead by another plugin 265. This child plugin 265 is suitably the plugin which would have been present but for the agent plugin 260.

In one example, the utility 250 is invoked as described above. The utility 250 loads the agent plugin 260, which is the registered plugin according to the plugin configuration file 254. However, the agent plugin 260 now loads the child plugin 265. This child plugin 265 is suitably located in the default location for the utility 250, such as at /usr/local/libexec/sudo/sudoers.so. The agent plugin 260 initialises the child plugin 265, as if the utility 250 had done so. Conveniently, the agent plugin 260 replicates the API as used by the utility 250. The child plugin 265 will now treat the agent plugin 260 as if it were communicating via the API with the utility 250.

The utility 250, the agent plugin 260 and the agent 700 now communicate as noted above. The agent plugin 260 is instructed by the agent 700 to perform passive handling of a particular requested command, as at 707 of FIG. 3. In response, the agent plugin 260 now passes the requested command to the child plugin 265. Also, the agent plugin 260 forwards any response from the child plugin 265 back to the utility 250, which typically will either permit or deny the requested command. The agent plugin 260 may also inform the agent 700 of the outcome as determined by the child plugin 265. The agent 700 can meanwhile audit the commands which were handled passively.

Notably, this mechanism allows the child plugin 265 to be loaded and used as if being called directly by the utility 250. The utility 250 meanwhile is unaware of the agent plugin 260 as intermediary. Advantageously, a default behaviour of the utility 250 and of the child plugin 265 is maintained for those commands that the agent 700 determines should have passive handling. Also, there is now a fail-safe option, in that the child plugin 265 will maintain an expected behaviour for commands that are passively handled. This passive handling is useful particularly in the event that a particular user or command is not specified in the policy file 750, because a default behaviour is still enacted by the child plugin 265. In practice, the child plugin 265 may be the default plugin as supplied with the utility 250. The child plugin 265 may thus use the policy configuration file 252 (i.e. the sudoers file) to implement configuration which has been specified on the host device 200, but only in relation to commands that are determined by the agent 700 to be handed passively in this way. Hence, the system can now quickly and safely supersede the local configuration file 252 for specific situations, allowing rapid responses and network-wide consistency when needed, while still enabling existing legacy functionality and behaviour to continue in place for other commands, users and/or devices, as appropriate.

Tamper Protection

In one example, the agent 700 is configured to monitor one or more of the configuration files of the utility 250. In particular, the agent 700 monitors the plugin configuration file 254 (i.e. sudo.conf) for any deviations from its expected state. In the event that the agent plugin 260 is not correctly registered, then the agent 700 will update the configuration in the configuration file 254 of the utility 250. In this way, any tampering with the configuration file 254 is quickly detected and corrected.

Figure 5:
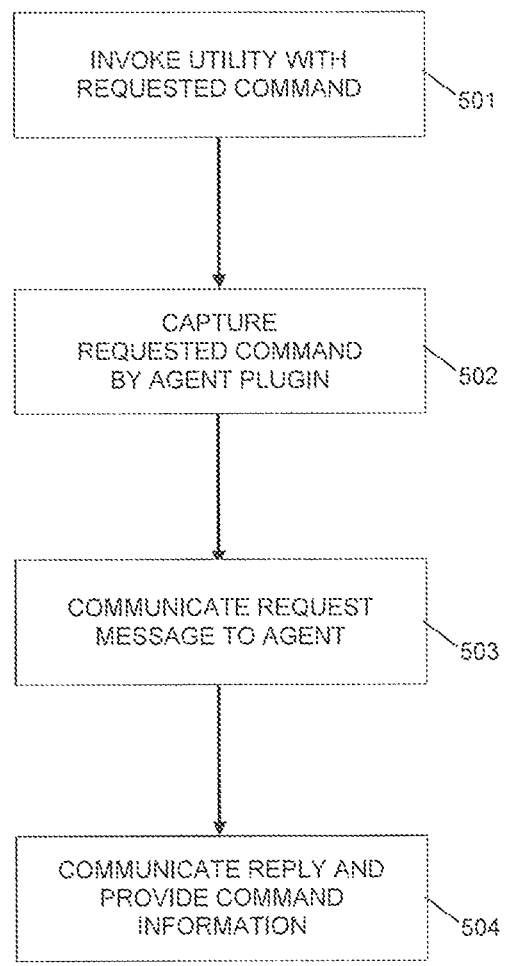
FIG. 5 is a flowchart of an example method of operating the computer device.

FIG. 5 is a flowchart illustrating an example method of managing privilege delegation in a computer device. At 501, a utility is invoked by a first user account, which is conveniently the primary user account as discussed above. This utility is configured to temporarily delegate privileges of a second user account to a requested command in an operating system of the computer device. At 502, the requested command is captured by an agent plugin which is provided as a plugin to the utility. Suitably, a frontend of the utility passes the command and related arguments via the API to the agent plugin, which is registered as the policy plugin of the utility. At 503, a request message is communicated from the agent plugin to an agent which determines an outcome for the requested command including at least allowing or blocking the requested command. At 504, a reply message is communicated from the agent to the agent plugin, wherein the agent plugin, if the reply message indicates that the requested command is allowed, provides command information to the utility to run the requested command by the operating system with delegated privileges of the second user account. Further features of the method will be appreciated from the discussion above.

The example embodiments have many benefits and advantages, as will now be appreciated from the discussion herein. In particular, privilege delegation for each computer device in the network is managed more efficiently and with enhanced functionality.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A method of managing privilege delegation in a computer device, comprising:
  loading a child plugin by an agent plugin;
  invoking a utility with a requested command by a first user account, wherein the utility temporarily delegates privileges of a second user account to the requested command in an operating system of the computer device and the utility comprises an application programming interface (API);

capturing the requested command by the agent plugin which is provided as a plugin to the utility, wherein the agent plugin replicates the API as used by the utility;

communicating with a request message from the agent plugin via the child plugin to an agent which determines an outcome for the requested command; and communicating with a reply message from the agent via the child plugin using the API to the agent plugin, wherein the agent plugin, if the reply message indicates that the requested command is allowed, provides command information to the utility to run the requested command by the operating system with delegated privileges of the second user account.

2. The method of claim 1, further comprising presenting custom messaging by the agent plugin in response to an instruction in the reply message from the agent.

3. The method of claim 2, wherein the custom messaging comprises a message dialog in a terminal from which the utility was invoked.

4. The method of claim 2, wherein the custom messaging presents a custom block message provided by the agent in the reply message upon determining blocking of the requested command.

5. The method of claim 2, further comprising relaying input to the message dialog from the agent plugin to the agent, wherein the agent determines allowing or blocking of the requested command based also on the input of the dialog as relayed by the agent plugin.

6. The method of claim 2, wherein the custom messaging comprises at least one of a confirmation, a challenge-response, and a reason.

7. The method of claim 2, further comprising performing auditing by the agent in relation to the custom messaging.

8. The method of claim 1, further comprising loading a child plugin by the agent plugin, and passively handling the requested command to the child plugin in response to an instruction in the reply message from the agent.

9. The method of claim 8, further comprising loading the child plugin by the agent plugin from a default plugin location of the utility.

10. The method of claim 8, further comprising passing the requested command from the agent plugin to the child plugin and passing a response from the child plugin via the agent plugin to the utility.

11. The method of claim 10, wherein the agent is informed by the agent plugin of the response from the child plugin.

12. The method of claim 1, further comprising monitoring, by the agent, a configuration file of the utility where a plugin is registered and, when the agent plugin is not registered, registering the agent plugin in the configuration file.

13. The method of claim 1, wherein capturing the requested command further comprises capturing an argument of the requested command as input to the utility.

14. The method of claim 1, wherein the request message further comprises a set of identities captured by the agent plugin, and wherein the agent determines an outcome for the requested command based on the set of identities in the request message.

15. The method of claim 14, wherein the set of identities include at least a user identity (UID) of the first user account, a group identity (GID), a process identity (PID) of the utility, and a process identity of a parent process (PPID).

16. The method of claim 1, wherein the agent is coupled to a policy file containing rules which define conditions for the first user account to access the requested command.

17. The method of claim 16, further comprising updating the policy file by the agent with updates from a network location accessible by the computer device.

18. A computer device, comprising:
a processor; and
a non-transitory machine-readable medium storing instructions which when executed by the processor perform a set of operations including:
loading a child plugin by an agent plugin;
invoking a utility along with a requested command by a first user account, wherein the utility temporarily delegates privileges of a second user account to the requested command in an operating system of the computer device and the utility comprises an application programming interface (API);
capturing the requested command by the agent plugin which is provided as a plugin to the utility, wherein the agent plugin replicates the API as used by the utility;
communicating with a request message from the agent plugin to an agent which determines an outcome for the requested command from a set of outcomes including at least: allowing the requested command, and blocking the requested command; and
communicating with a reply message from the agent via the child plugin to the agent plugin based on a call to the API, wherein the agent plugin, if the reply message indicates that the requested command is allowed, provides command information to the utility to run the requested command by the operating system with delegated privileges of the second user account.

19. A non-transitory machine-readable medium having instructions recorded thereon which when executed cause a computer device to perform a set of operations including:
loading a child plugin by an agent plugin;
invoking a utility by a first user account, wherein the utility temporarily delegates privileges of a second user account to a requested command in an operating system of the computer device and the utility comprises an application programming interface (API);
capturing the requested command by the agent plugin which is provided as a plugin to the utility, wherein the agent plugin replicates the API as used by the utility;
communicating with a request message from the agent plugin via the child plugin to an agent which determines an outcome for the requested command from a set of outcomes including at least: allowing the requested command, and blocking the requested command; and
communicating with a reply message from the agent via the child plugin to the agent plugin based on a call to the API, wherein the agent plugin, if the reply message indicates that the requested command is allowed, provides command information to the utility to run the requested command by the operating system with delegated privileges of the second user account.

20. The method of claim 1, wherein the agent plugin initializes the child plugin for communication with the agent plugin via the API.

* * * * *